No. 771,710. PATENTED OCT. 4, 1904.
R. N. CHAMBERLAIN.
SYSTEM OF ELECTRICAL DISTRIBUTION.
APPLICATION FILED MAR. 19, 1903.
NO MODEL. 2 SHEETS—SHEET 1.
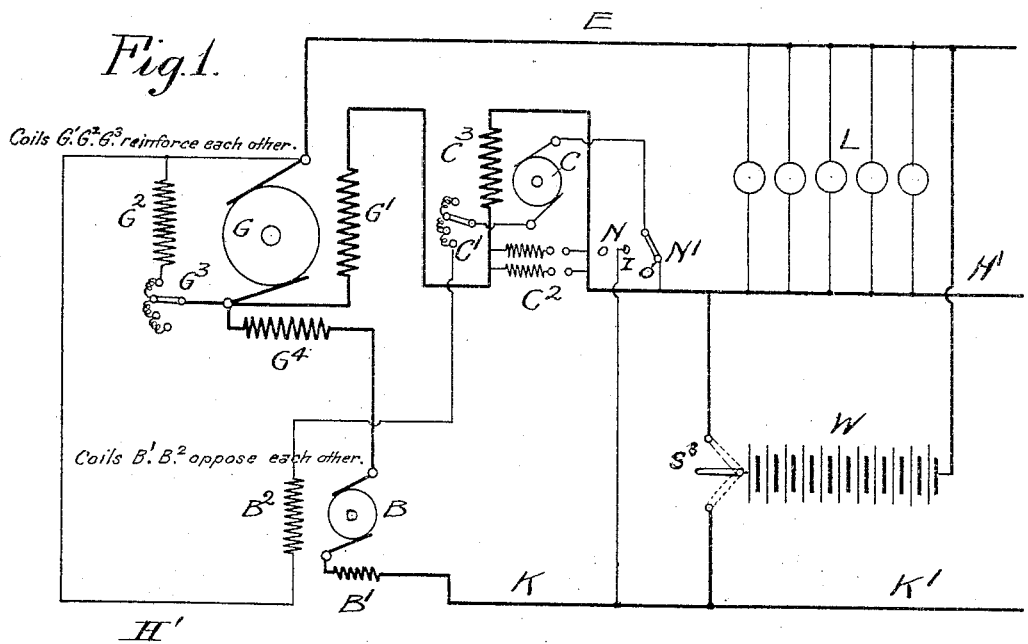
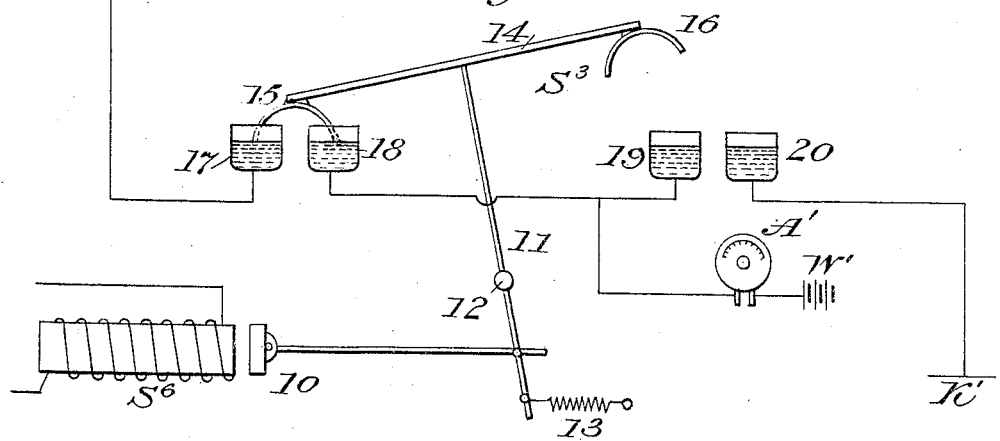
Witnesses
Inventor.
Rufus N. Chamberlain
By his Attorneys
Knight Bros.

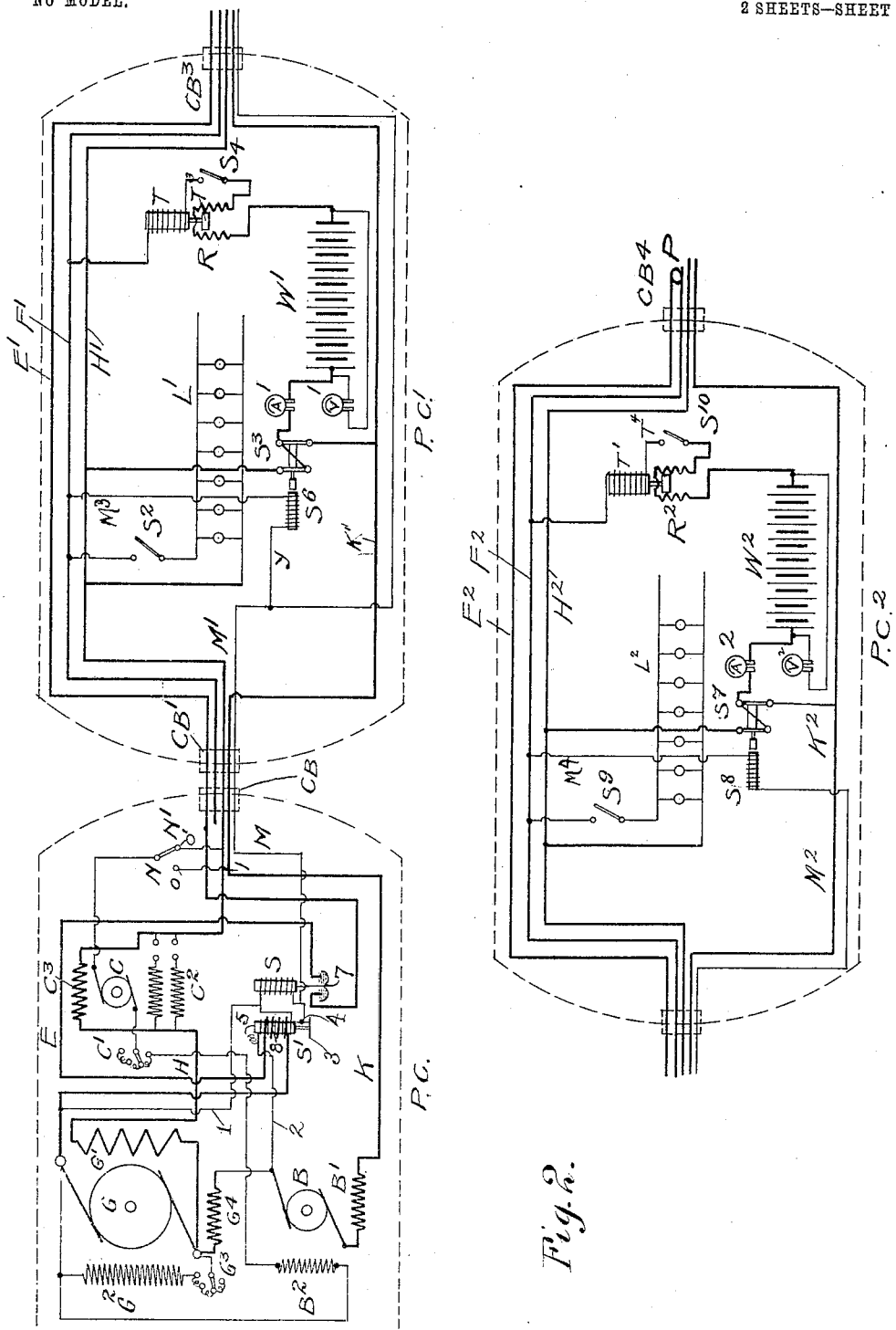

No. 771,710.

Patented October 4, 1904.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

SYSTEM OF ELECTRICAL DISTRIBUTION.

SPECIFICATION forming part of Letters Patent No. 771,710, dated October 4, 1904.

Application filed March 19, 1903. Serial No. 148,477. (No model.)

*To all whom it may concern:*

Be it known that I, RUFUS N. CHAMBERLAIN, a citizen of the United States, residing at Depew, in the county of Erie and State of New York, have invented certain new and useful Improvements in Systems of Electrical Distribution, of which the following is a specification.

My invention relates to systems of electrical distribution which comprises a generator, a consumption-circuit, a storage battery, and booster.

The object of my invention is to provide means in connection with distributing systems of the above-described character to preserve a substantially constant load on the generator regardless of variations of load in the consumption-circuit. To this end I provide a system in which a storage battery may be connected interchangeably either with the generator and booster or with the consumption-circuit.

Other objects of the invention will appear in the following specification.

In the accompanying drawings I have illustrated a system embodying my invention.

Figure 1 is a diagrammatic view illustrating the general features of the invention. Fig. 2 is a similar view illustrating the invention as applied to the lighting of railway-cars. Fig. 3 is a detail, on an enlarged scale, showing the construction of switches $S^3$ $S^7$.

Referring to Fig. 1, G is the main generator; E H', the consumption-circuit, including a set of lamps L. W is the storage battery, with connections to the consumption and booster and generator circuits, as shown, by means of a switch $S^3$. B is the auxiliary generator or booster; and C is a counter-electromotive-force generator with connections N and N' to the generator and booster in series or to the main generator alone, respectively. The generator G is shown provided with a shunt field-coil $G^2$, rheostatic field-resistance $G^3$, with compounding-coils $G'$ and $G^4$ in series in the consumption and battery circuits, respectively, which reinforce field-coil $G^2$ and maintain a constant generator-voltage under varying loads. The auxiliary generator or booster B is provided for supplying the additional voltage required for charging the batteries. It has a series field-coil $B'$ in the battery-circuit and a field-coil $B^2$ in the circuit of the counter-electromotive-force generator C. Coil $B'$ opposes coil $B^2$, and thus protects the batteries from excessively high charging rates. The output of the booster is governed by the counter-electromotive-force generator C, which controls its field strength by its connection with field-coil $B^2$, this coil being excited either by the main generator G or by the main generator and the booster B, according to the connections at N' and N, respectively. The counter-electromotive-force generator C is responsive to load changes in the consumption-circuit, its field $C^3$ being in series in that circuit. A rheostatic resistance $C'$ is provided to regulate the current in the circuit of the counter-electromotive-force generator, and adjustable shunts $C^2$ are also provided to regulate the effect of coil $C^3$.

In practice the above-described system may be employed wherever distribution in the manner and of the character indicated is desired—as, for instance, for city or village, street and house lighting, or for power. My invention is, however, more particularly adapted to a train-lighting system in which the generators are carried on a separate car or the locomotive, and in which each car to be lighted forms a separable consumption-circuit having a storage battery and capable of being operated either when coupled in a train and connected with the generators or uncoupled and disconnected from the generators, and also when for any reason the generators are not operating or during generator overload. Fig. 2 of the drawings illustrates my invention as applied in such a system of train-lighting.

The same reference characters indicate corresponding parts in each of the figures.

The main features of the system having been described above in connection with Fig.

1 need not be further described. The additional features represented in Fig. 2 to adapt the system to the requirements of train-lighting and the automatically-acting switches and safety devices for interchangeably connecting the lighting-circuits with the batteries or generator and the batteries with the lighting-circuit or generators are described as follows: P C represents the generator-car or that part of the locomotive, passenger, or baggage car on which the generators and their automatic regulating devices are usually carried. P C' and P C$^2$ represent the passenger or other cars to be lighted. C B, C B', C B$^2$, C B$^3$, and C B$^4$ indicate connecting-boxes at the ends of the cars, which receive the terminals of the lighting and battery circuits and by means of which the cars are electrically connected to each other. One of the feeders E E' E$^2$ of the lighting-circuit is formed with a return-loop F$^2$ F', to which the respective lamp-circuits are connected. By this means uniform potential is maintained throughout the line. The lighting-circuits L' L$^2$ in each car are connected with the feeders, as shown. A switch or plug P connects the two limbs E' F' E$^2$ F$^2$ of the feeder E at the end of the last car on the train. Each car is provided with a storage battery W' W$^2$ with ammeters A' A$^2$ and voltmeters V' V$^2$, respectively, for indicating their condition. The batteries supply current for the lights in the respective cars when the generator is not running or when the car is disconnected from the generator or when the generator is overloaded. Automatic resistances R R$^2$ are provided, if necessary, in each car in the connections between the feeders and the batteries to protect the latter from excessively high charging rates. These resistances are controlled by magnets T' T$^2$, which are excited in proportion to the strength of the current passing through them and cause the armatures T$^3$ T$^4$, which contact with the coils of the resistances R, to cut resistance in or out according to the strength of the current. Switches S$^2$ S$^9$ are provided in each car for connecting the lights with the feeders F' H' and F$^2$ H$^2$, respectively, and switches S$^4$ S$^{10}$ are provided for connecting the batteries in each car with the feeders. Automatic devices are provided for controlling the circuit between the generator and the lights and the batteries, and in case the generator should fail to supply current or be disconnected to prevent the batteries discharging into the generator. These devices consist of a relay S', wound for the generator-voltage and connected across the terminals of the generator in a circuit 1 2. The armature 3 of said relay S' is connected in a branch 5 of said circuit 1 2, and when the generator-voltage has reached a certain predetermined point relay S' is energized, and its armature 3 makes contact at 4, whereupon current flows to a relay S, connected in the same circuit 1 2, through armature 3 and branch 5. The armature of relay S is connected with a switch 7 of any suitable kind—such, for instance, as a mercury-switch (indicated in the drawings)—so that when relays S' and S become energized by the generator reaching its proper voltage the switch 7 closes the main feeder E E' E$^2$ and connects all the cars with the generating apparatus. Switches S$^3$ S$^7$ are provided for automatically and interchangeably connecting the batteries with the lights or the charging-circuit according as the generator-voltage is above or below a predetermined point or is disconnected. When these switches connect the batteries with the lights, the generator and batteries are in parallel, and should the driving power fail or the generator for any reason fail to supply the current the batteries would discharge into the generator. To prevent this, relay S' is provided with a winding 8 in series with the line E E' E$^2$, which neutralizes the magnetism in the relays S' S, and the switch 7 would then open. The switches S$^3$ and S$^7$, above referred to, are operated by magnets S$^6$ and S$^8$, respectively. These magnets are energized by circuits M M' M$^3$ and M$^2$ M$^4$ and controlled by the action of relay S'.

The construction of the switches S$^3$ and S$^7$ is illustrated in Fig. 3. Since both these switches are of similar construction, the description and illustration of one of them will suffice. Referring to Fig. 3, S$^6$ is a magnet-relay, having its armature 10 connected to an arm 11, as shown, the arm 11 being pivoted at 12. A cross-arm 14 is rigidly connected to arm 11 and carries at its ends the contacts 15 and 16. These contacts make electrical connection with pairs of terminals 17 18 and 19 and 20, respectively. These terminals are shown in the form of mercury-cups. In the position shown terminal 17 is connected by contact 15 with terminal 18. Terminal 17 is connected to the lead H'. Terminals 18 and 19 are connected together and to battery W' through ammeter A'. Terminal 20 is connected to the lead K' K and the booster B. In the position shown in Fig. 3 the battery is connected with the lighting-circuit—as, for instance, when the cars are disconnected from the generator or the generator-voltage is insufficient to supply the lights. When the generator is connected up and its voltage attains the proper amount, switches S' S operate and current through M energizes magnet-relays S$^6$ S$^8$, which throw switch-arm 11 against the action of spring 13 and connects the batteries with the booster. When the cars are disconnected from the generator or the voltage of the generator falls below the amount required for the lights, spring 13 overcomes magnet-relay S$^6$ and the batteries are switched on the lighting-circuit.

The operation of the system is as follows: Assuming that the generator is running and the lighting-circuit is disconnected, the current flowing through circuit 1 and 2 and relay $S'$ energizes said relay and when the voltage has risen to the predetermined point closes switch 7, whereupon current flows through wire E, switch 7, wires $E'$ $E^2$, plug P, wires $F^2$ $F'$, switches $S^{10}$ $S^4$, resistances $R^2$ $R'$, batteries $W^2$ $W'$, ammeters $A^2$ $A'$, to automatic switches $S^7$ $S^3$. These switches by the operation of relay $S'$, closing connection at 3 and 4, have been thrown to connect the batteries with wires $K^2$, $K'$, and K, leading to booster-field $B'$, booster-armature B, and through generator-field $G^4$ back to the return-brush of generator G. The lighting-circuit being disconnected, no current passes through $H^2$ $H'$ and the field $C^3$ of the counter-electromotive-force machine C is not excited. This machine therefore does not generate, and the full current of either the generator or the generator and booster in series (according to whether switch N is at contact O or I) will flow through booster field-coil $B^2$. The booster being fully excited will generate to its full capacity, and the entire output of the generating plant will be delivered to the batteries. Field-coil $G^4$ of the generator by compounding will keep the generator-voltage constant. Booster field-coil $B'$, being opposed to field-coil $B^2$, as stated, decreases the booster field strength in proportion to the load, so that the current cannot rise above a certain fixed limit, and the batteries are protected from excessively high charging currents, as would be likely to ensue if the batteries should be for any reason very low in voltage. When now a lighting-circuit is switched in by closing a switch $S^2$ $S^9$, the generators still running, the field $C^3$ of the counter-electromotive-force machine C will be excited and this machine will generate. Under these conditions booster-field $B^2$ will be reduced in strength by the counter electromotive force of the machine C and the booster will generate less in exact ratio to the load in the lighting-circuits. The generator field-coil $G^4$ will act in the battery-circuit similarly to the coil $G'$, which acts in the lighting-circuit—that is, to keep the generator-voltage constant. When a full load is on the lighting-circuit, the counter-electromotive-force machine C will generate current of a strength to neutralize entirely the excitation of booster field-coil $B^2$. The booster-voltage will thus become zero, and the batteries will be in a neutral condition. When the load becomes heavier than the capacity of the main generator, booster-field $B^2$ will be reversed, and the booster will then generate current in the opposite direction, the batteries supplying the increase of current required for the load—in other words, the batteries discharging in series with the booster. When the generator is disconnected or not working—as, for instance, when its car is cut off from the train or the motive power is idle or disconnected—relays $S'$ and S are not excited, and therefore magnets $S^6$ $S^8$ are not energized. Switches $S^3$ $S^7$ are consequently thrown over, and the batteries are connected in parallel with the feeders $H'$ $F'$ $H^2$ $F^2$ feeding the lights. My system is thus automatically operating for all conditions of service. Any car may be disconnected from the generating plant, and the storage batteries will automatically feed the lighting-circuit. The booster-voltage is automatically controlled proportionately to the load in the lighting-circuit, so as to operate in conjunction with the batteries and assist their action both on charge and discharge. The system is automatic in all its features and requires no attention on the part of an attendant—a feature which makes the invention particularly adapted to train-lighting.

Various changes and modifications may be made from the system as herein shown and described without departing from the scope of the invention. For instance, the booster on the locomotive or baggage-car may be transferred and a separate booster placed in each car. This merely subdivides the booster power; also, the counter-electromotive-force machine may be transferred and a separate counter-electromotive-force machine be placed upon each car.

Having thus described my invention, what I claim as new therein, and desire to secure by Letters Patent, is—

1. In a system of electrical distribution, the combination of a generator and a booster in series relation, a consumption-circuit connected with the generator, a charging-circuit, a storage battery, and means operating upon the battery-circuit alone, for transferring the battery from the consumption-circuit to the charging-circuit upon the generator-voltage reaching the proper amount.

2. In a system of electrical distribution, the combination of a generator and a booster in series relation, a consumption-circuit connected with the generator, a charging-circuit, a storage battery, and automatic means operating upon the battery-circuit alone, for transferring the battery from the consumption-circuit to the charging-circuit upon the generator-voltage reaching the proper amount.

3. In a system of electrical distribution, the combination of a generator and a booster in series relation, a consumption-circuit connected with the generator, a charging-circuit, a storage battery and means operating upon the battery-circuit for transferring the battery from the consumption-circuit to the charging-circuit and a shunt-circuit in the generator-circuit automatically actuating the transferring means upon the generator-voltage reaching the proper amount.

4. In a system of electrical distribution, the combination of a generator and a booster in series relation, a consumption-circuit connected with the generator, a charging-circuit, a storage battery, and means operating upon the battery-circuit, for transferring the battery from the charging-circuit to the consumption-circuit upon the generator-voltage falling below the proper amount.

5. In a system of electrical distribution, the combination of a generator and a booster in series relation, a consumption-circuit connected with the generator, a charging-circuit, a storage battery, and means operating upon the battery-circuit for transferring the battery from the consumption-circuit to the charging-circuit upon obtaining the predetermind voltage in the charging-circuit.

6. In a system of electrical distribution, the combination of a generator and a booster in series relation, a consumption-circuit connected with the generator, a charging-circuit, a storage battery, and means operating upon the battery-circuit for transferring the battery from the charging-circuit to the consumption-circuit upon the predetermined voltage in the charging-circuit falling below its proper value.

7. In a system of electrical distribution, the combination of a generator and a booster in series relation, two or more storage batteries, two or more consumption-circuits connected with the generator, and means for paralleling the consumption-circuit and battery when the generator is not operatively connected.

8. In a system of electrical distribution, the combination of a generator and a booster in series relation, two or more storage batteries, two or more consumption-circuits connected with the generator, and automatic means for paralleling the consumption-circuit and battery when the generator is not operatively connected.

9. In a system of electrical distribution, the combination of a generator, a consumption-circuit connected therewith, a booster in series relation with the dynamo, a storage battery, and means whereby the storage battery may be included in series with the generator and booster or in multiple in the consumption-circuit.

10. In a system of electrical distribution, the combination of a generator, a consumption-circuit connected therewith, a booster in series relation with the dynamo, a storage battery, and automatically-operated means for connecting the storage battery in series with the generator and booster or in multiple in the consumption-circuit.

11. In a system of electrical distribution, the combination of a generator, a consumption-circuit connected therewith, a booster in series relation with the dynamo, a storage battery, and means controlled by the generator-voltage for connecting the storage battery in series with the generator and booster or in multiple in the consumption-circuit.

12. A system of electrical distribution, comprising a source of electrical supply, a consumption-circuit connected therewith, a booster in series relation with said source of supply, a storage battery, and means whereby the storage battery may be included in the circuit containing the source of supply and the booster in series relation, or in circuit across the consumption-circuit.

13. The combination of a consumption-circuit, a storage-battery circuit, a generator and a booster in series relation and connected to supply either or both of said circuits, and automatic switch devices responsive to the generator-voltage for connecting and disconnecting the battery-circuit with the consumption-circuit.

14. In a system of electrical distribution the combination of a consumption-circuit and a battery-circuit having one conductor in common, a generator included between the common conductor and the other conductor of each of said circuits, a booster in series with the battery and generator, and means connecting the battery-circuit with the consumption-circuit when the generator is inoperative but disconnecting said circuit when the generator operates to supply the consumption-circuit.

15. In a system of electrical distribution, the combination of a consumption-circuit and a battery-circuit having one conductor in common, a generator included between the common conductor and the other conductor of each of said circuits, a booster in series with the battery and generator, and means connecting the battery-circuit with the consumption-circuit and disconnecting the battery from the generator when the generator is inoperative but disconnecting said circuits and connecting the battery with the generator when the generator operates to supply the consumption-circuit.

16. A system of electrical distribution comprising consumption and battery circuits, a generator for supplying the consumption-circuit, a battery in the battery-circuit, means closing the battery-circuit through the generator independently of the consumption-circuit, when the generator is operating, but opening said circuit and connecting the battery and consumption circuits when the generator is not operating, and a booster forming part of said circuit through the battery and generator, when made, operating to take the output of the generator not consumed in the consumption-circuit and supply it to the battery.

17. A system of electrical distribution, comprising a generator and booster in series relation, a consumption-circuit divided into one or more divisions capable of being connected together to the generator to form a single consumption-circuit, a storage battery in each of said divisions, and automatic means whereby the storage batteries may be included in series with the dynamo and booster or in multiple with the respective divisions of the consumption-circuit.

RUFUS N. CHAMBERLAIN.

Witnesses:
 CLAY P. GOODING,
 GEO. D. SQUIRES.